United States Patent
Moore et al.

(10) Patent No.: US 9,783,288 B1
(45) Date of Patent: Oct. 10, 2017

(54) LIFT FAN POSITION LOCK MECHANISM

(71) Applicant: Kitty Hawk Corporation, Mountain View, CA (US)

(72) Inventors: Robert Wayne Moore, Fremont, CA (US); Geoffrey Alan Long, Montara, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/372,125

(22) Filed: Dec. 7, 2016

(51) Int. Cl.
*B64C 27/32* (2006.01)
*B64C 29/00* (2006.01)
*H01F 7/02* (2006.01)

(52) U.S. Cl.
CPC ........ *B64C 27/322* (2013.01); *B64C 29/0025* (2013.01); *B64C 29/0091* (2013.01); *H01F 7/0226* (2013.01)

(58) Field of Classification Search
CPC ........ F01D 19/00; F01D 21/00; F01D 21/006; F03D 7/0244; F03D 7/0248; F05B 2260/90; F05B 2260/902; F05B 2260/903; F05D 2260/90; F05D 2260/902; F05D 2260/903; B64C 27/24; B64C 27/322; B64C 29/0025; B64C 29/0091; B64C 2201/00; B64C 2201/08; B64C 2201/162; B64C 2201/165; H01F 7/0226; E05B 47/0038; E05B 47/06; E05B 47/0607; F16D 27/01; F16D 27/14; F16D 43/14; F16D 43/16; F16D 49/08; F16D 59/02; F16D 63/002; F16D 67/06; F16D 71/04; F16D 2121/18; F16D 2121/20; F16D 2500/10475

USPC ........ 415/18, 19, 122.1, 123; 416/3, 43, 44, 416/45, 51, 52, 146 R, 169 R, 244 R, 416/244 A, 248; 244/92, 99.2, 111, 244/110 A, 110 H; 70/276; 192/46, 192/56.42, 66.31, 103 A, 104 R, 223; 188/68, 69, 72.9, 161, 164, 265

See application file for complete search history.

(56) References Cited

U.S. PATENT DOCUMENTS

| | | | | |
|---|---|---|---|---|
| 6,650,212 B1 * | 11/2003 | Weems | ........... | B64G 1/641 335/285 |
| 8,177,037 B2 * | 5/2012 | Kim | ........... | B60T 8/345 188/72.2 |
| 8,544,627 B2 * | 10/2013 | Lawrence | ........... | F16D 27/004 192/115 |
| 9,115,774 B2 | 8/2015 | Long | | |
| 9,163,680 B2 * | 10/2015 | Swihart, III | ........... | F16D 59/00 |

(Continued)

*Primary Examiner* — Craig Kim
*Assistant Examiner* — Alexander White
(74) *Attorney, Agent, or Firm* — Van Pelt, Yi & James LLP

(57) ABSTRACT

A lift fan position lock mechanism is disclosed. In various embodiments, a position lock mechanism includes a ring structure having a first surface, the ring structure including one or more detents defined in the first surface of the ring structure. For each detent, the lock mechanism includes a stationary magnet coupled fixedly to the ring structure at a location adjacent to the detent. The lock mechanism further includes a rotating magnet assembly comprising a magnet of opposite magnetic polarity to at least one of the stationary magnets and a mechanical stop structure of a size and shape to fit into a corresponding detent and engage mechanically with a surface defining at least one extent of said corresponding detent when the rotating magnet assembly is in a locked position.

19 Claims, 7 Drawing Sheets

(56) References Cited

U.S. PATENT DOCUMENTS

| | | | | |
|---|---|---|---|---|
| 9,193,451 B2* | 11/2015 | Salyer | ................... | B64C 37/00 |
| 2014/0102251 A1* | 4/2014 | Corsetti | ................ | B60K 6/48 |
| | | | | 74/665 A |
| 2015/0027828 A1* | 1/2015 | Michelson | ............. | F16D 49/00 |
| | | | | 188/267 |
| 2016/0236658 A1* | 8/2016 | Rozza | ................ | B60T 13/748 |

* cited by examiner

LIFT FAN POSITION LOCK MECHANISM

BACKGROUND OF THE INVENTION

Lift fans and other rotors, collectively referred to herein as "lift fans", may be used to provide lift to manned or unmanned multirotor aircraft, such as personal aircraft and drones. Mixed flight mode aircraft may use lift fans to provide lift in a vertical flight mode, e.g., to take off, hover, or land. Such an aircraft may transition after takeoff into a forward flight mode in which one or more forward flight propellers may be used to propel the aircraft through the air. Lift may be generated in the forward flight mode by one or more wings comprising the aircraft.

In the forward flight mode, unless locked the lift fans may generate drag and/or other undesirable forces. It may not be practical to use conventional mechanisms to lock lift fan rotors, e.g., due to weight considerations, uncertainty as to rotor position as the aircraft transitions into forward flight, and/or other considerations.

BRIEF DESCRIPTION OF THE DRAWINGS

Various embodiments of the invention are disclosed in the following detailed description and the accompanying drawings.

DETAILED DESCRIPTION

Figure 1:
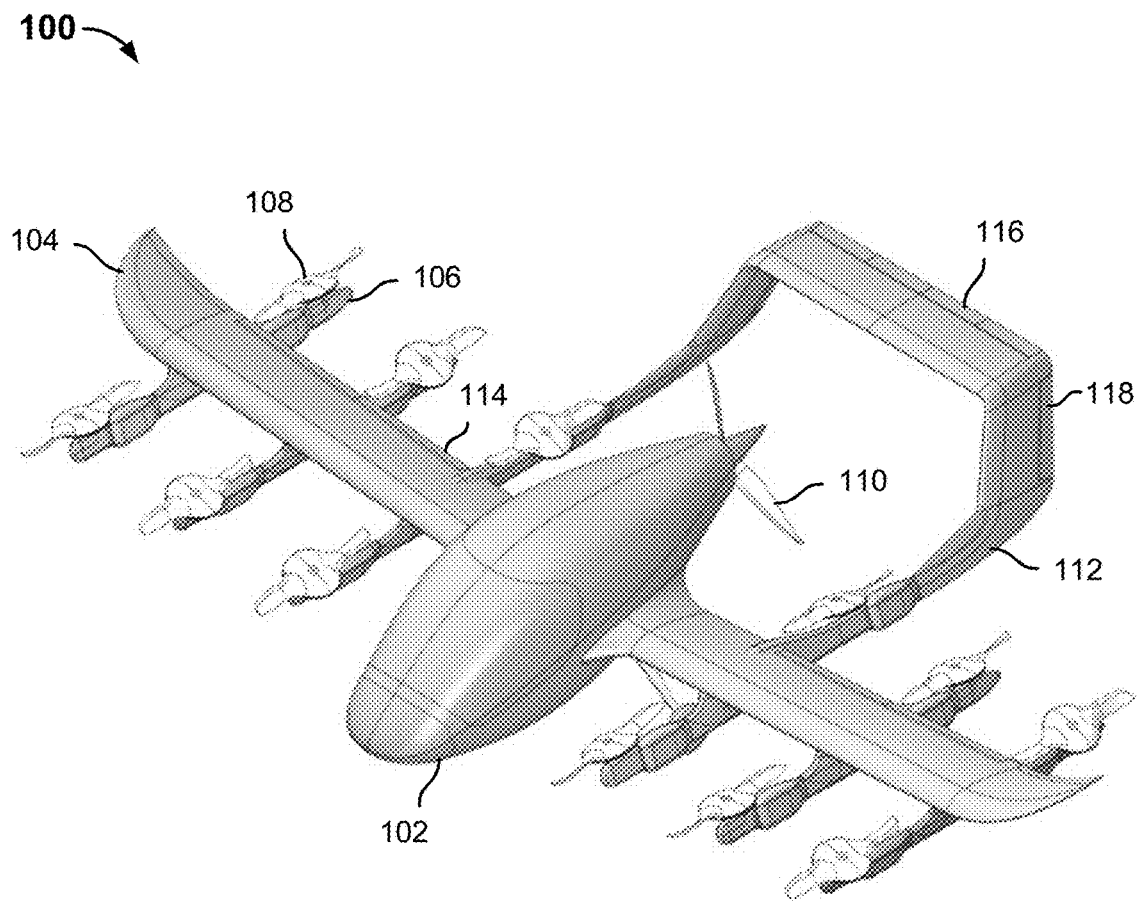
FIG. 1 is a block diagram illustrating an embodiment of a multicopter aircraft.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A lift fan position lock mechanism is disclosed. In various embodiments, a lift fan rotor is held in place by a rotor magnet that is affixed to the rotor and which in the locked position engages and is held in place magnetically by a corresponding stationary magnet mounted on a stationary structure that does not rotate when the lift fan rotor rotates, such as a stator, housing, or other non-rotating structure. In some embodiments, the stationary magnet is mounted on a tab extending inwardly from a metal or other ring structure. The ring structure provides a surface on which an assembly comprising the rotor magnet may slide, e.g., when the rotor is first moved out of the locked position by applying a startup torque via an associated motor. In some embodiments, as the rotor increases in rotational speed a centrifugal force is generated and causes the rotor magnet to rotate about a pivot axis as it moves up and outwardly away from the ring structure.

In various embodiments, a lift fan lock routine or procedure is followed to lock a lift fan using a lock mechanism as disclosed herein. Lift fan speed is reduced, e.g., by discontinuing the application of torque via the lift fan motor and/or by applying a counteracting torque. A position of the lift fan rotor relative to a locked position is determined and a corresponding electrical stimulus that is associated with causing the lift fan rotor to rotate at least to the locked position is determined and applied to the lift fan motor. In various embodiments, a torque less than a breakout torque required to drive the lift fan rotor out of the locked position is applied. During the lock routine, the rotor magnet may be attracted to and may lock into a position adjacent to a corresponding stationary magnet, resulting in the rotor being locked in place.

In some embodiments, two pairs of magnets (i.e., two rotating and two stationary) may be used. In some such embodiments, the rotating and stationary magnets may have opposite magnetic polarity, such that a rotating magnet is attracted to a corresponding stationary magnet of opposite magnetic polarity but repelled by a stationary magnet of the same magnetic polarity. In some embodiments, using magnets of alternating polarity results in the lift fan locking in only one position.

FIG. 1 is a block diagram illustrating an embodiment of a multicopter aircraft. In various embodiments, a lift fan position lock mechanism as disclosed herein may be included in a multicopter aircraft as shown in FIG. 1. In the example shown, aircraft 100 includes a fuselage (body) 102 and wings 104. A set of three underwing booms 106 is provided under each wing. Each boom 106 has two lift fans 108 mounted thereon, one forward of the wing and one aft. Each lift fan 108 may be driven by an associated drive mechanism, such as a dedicated electric motor. One or more batteries (not shown) and/or onboard power generators (e.g., small gas turbine) may be used to drive the lift fans 108 and/or charge/recharge onboard batteries.

In various embodiments, each boom 106 may be positioned at an angle relative to a vertical axis of the aircraft such that the lift fans 108 are mounted thereon at an associated angle. The angle may be determined at least in part to satisfy design objectives and/or associated constraints, such as to provide yaw control and/or to avoid the plane of rotation of any lift fan intersecting a human-occupied or otherwise critical portion of the fuselage 102.

In the example shown in FIG. 1, a propeller 110 is mounted on the fuselage 102 and configured to push the aircraft through the air in the forward (e.g., x axis) direction when in a forward flight mode. The propeller 110 is positioned between a pair of tail booms 112 that extend aft and are joined at their aft end by a tail structure on which aerodynamic control surfaces including elevators 116 and rudders 118 are mounted. In various embodiments, each of the inboard booms 106 forms at least in part an integral part of the corresponding port/starboard side tail boom 112. In some embodiments, the tail booms 112 comprise extensions aft from the respective inboard booms 106. For example, the tail booms 112 may be formed as part of or fastened (e.g., bolted) to an aft end of the corresponding inboard boom 106. Additional control surfaces include ailerons 114 mounted on the trailing edge of wings 104.

In various embodiments, lift fans 108 may be used to provide lift to enable the multicopter aircraft 100 to takeoff, hover, and/or land vertically (or within a short horizontal distance) in a vertical flight mode. The multicopter aircraft 100 may be configured to use lift fans 108 to take off vertically, for example, and then transition into a forward flight mode in which the aircraft is pushed through the air by propeller 110 and the wings 104 provide lift. In the forward flight mode, in various embodiments, a lift fan lock mechanism as disclosed herein is used to lock lift fans 108 in a locked position. In some embodiments, the locked position may be a low (or relatively low) drag position. For example, in some embodiments, lift fans 108 may be locked in a position as shown in FIG. 1, in which the respective blades of each lift fan (of which there are two per lift fan in this example) are substantially aligned with a forward-aft longitudinal axis of one or both of the aircraft 100 and the booms 106. For aircraft configurations different from the aircraft 100 of FIG. 1 and/or lift fans having a different number and/or arrangement of blades than the lift fans 108 of FIG. 1, lock mechanisms as disclosed herein may be used to lock the lift fans in a different low or relatively low drag position than the example shown in FIG. 1.

A lift fan lock mechanism is disclosed. In various embodiments, a lift fan lock mechanism as disclosed herein may be used to lock and hold a lift fan in a low drag or other stowed position, for example during forward flight. In various embodiment, a lift fan lock as disclosed herein may include a stationary ring that is fixedly mounted to the aircraft, e.g., by being bolted or otherwise secured to a stator, housing, or other non-rotating portion of a lift fan assembly.

In some embodiments, a lift fan assembly, such as lift fans 108 of FIG. 1, may include an upper lift fan rotor and a lower rotating bowl or housing between which is sandwiched a stator, control circuitry, and other stationary elements that do not rotate. The upper lift fan rotor and lower rotating bowl may be affixed to a shaft that runs through but is not fixed to the stator. The upper lift fan rotor and lower rotating bowl may comprise rotor elements of a substantially flat, brushless DC motor used to drive the lift fan. The rotor elements may have magnets affixed to them and/or integrated in them. Current is supplied to the stator in a prescribed manner to cause the rotor elements to rotate.

In various embodiments, one or more rotor magnet assemblies comprising a lift fan lock mechanism as disclosed herein is/are affixed to each rotor element. Corresponding stationary magnets are affixed directly or indirectly to a stationary, non-rotating element, such as the stator, motor/lift fan housing, etc. In the locked position the magnet of the rotating magnet assembly is attracted magnetically to and is drawn to an engaged position with a corresponding stationary magnet of opposite magnetic polarity. The magnetic forces between the respective rotating magnets and each corresponding stationary magnet holds the lift fan in place, i.e., prevents rotation, unless a sufficient torque is applied by the lift fan motor. The torque required to break free from the locked position is sometimes referred to herein as the "break free" torque.

Figure 2A:
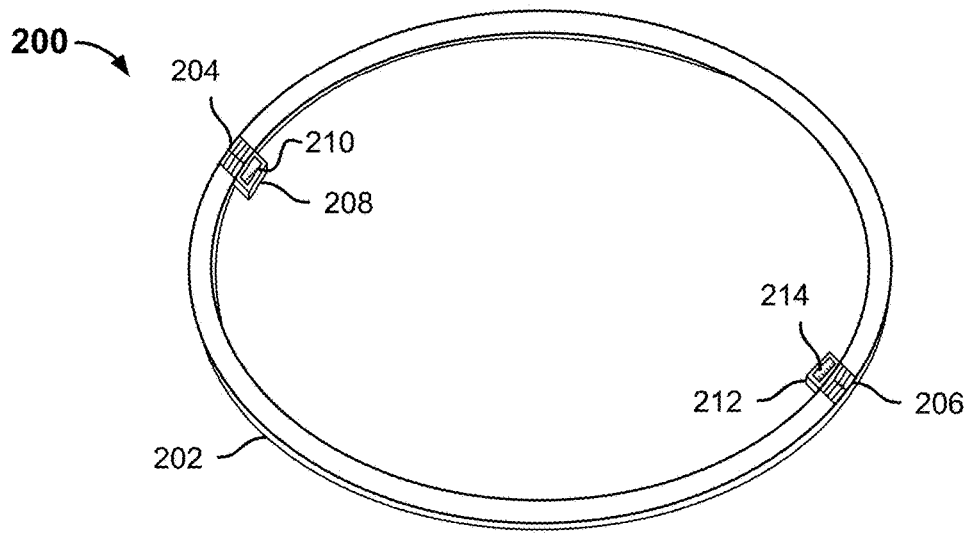
FIG. 2A is a block diagram illustrating a perspective view of an embodiment of a stationary ring portion of a lift fan lock mechanism.

FIG. 2A is a block diagram illustrating a perspective view of an embodiment of a stationary ring portion of a lift fan lock mechanism. In the example shown, stationary ring portion 200 of a lift fan lock mechanism comprises an annular metal ring 202 having an upper surface (top surface as shown) and a lower surface. In the example shown, ring 202 comprises a substantially flat ring. In some alternative embodiments, rings having other shapes (e.g., conical annulus) and/or other characteristics (e.g., inner/outer diameter, material, thickness, etc.) may be used. The ring 202 has notches or detents 204 and 206 formed therein, on a sliding surface of ring 202. In some embodiments, the notches 204 and 206 are V-shaped notches into which a rigid stop portion of a rotating magnet assembly, such as a ball, cylinder, pin or other structure, may be received and held when the lift fan is in a locked position. In various embodiments, a combination of one or more of magnetic force, spring force (e.g., from a helical torsion spring or other spring), and friction force (e.g., of the stop structure against the detent surface) may be used to hold the rotating magnet assembly in place when the lift fan is in the locked position.

Referring further to FIG. 2A, the notches 204 and 206 each has associated with it a metal (or other) tab portion (208, 212) on which a stationary magnet (210, 214) is mounted. In various embodiments, the magnets 210 and 214 may be of opposite polarity. As a result, only one of two rotating magnet assemblies may be attracted by magnetic force to a given one of the magnets 210, 214, and the other rotating magnet assembly will be repulsed. The differing polarities in some embodiments result in the lift fan lock mechanism only locking the lift fan in a single, same locked position, i.e., one in which each rotating magnet assembly is engaged with a corresponding stationary magnet of opposite polarity (and associated structures, such as the associated notch 204, 206).

Figure 2B:
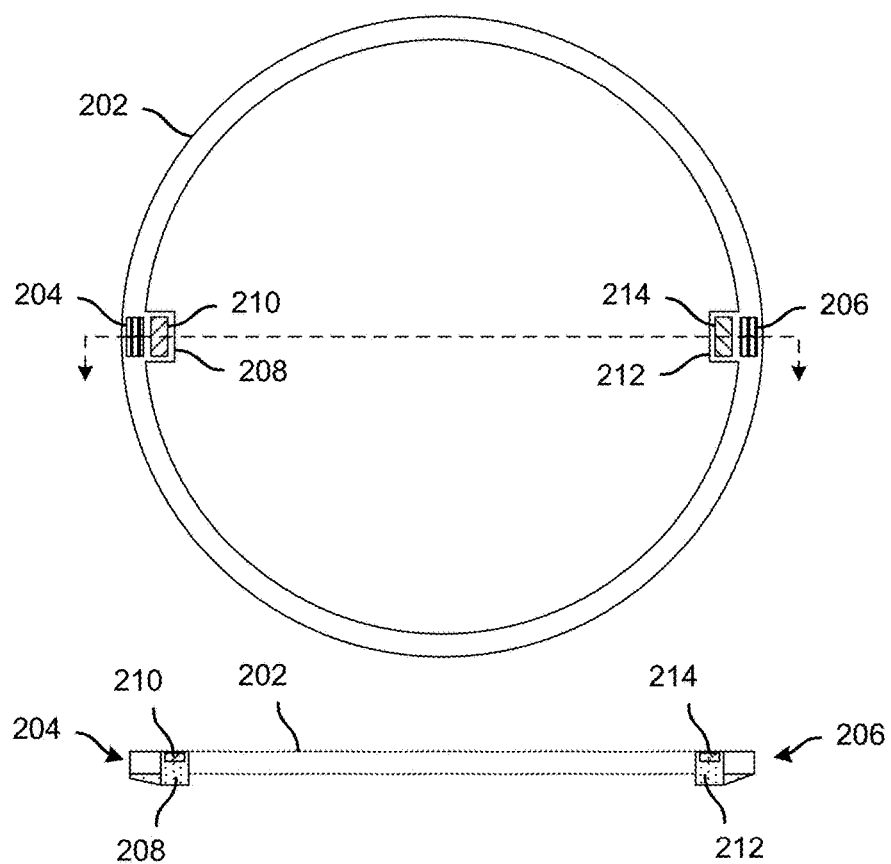
FIG. 2B is a block diagram illustrating top and side views of an embodiment of a stationary ring portion of a lift fan lock mechanism.

FIG. 2B is a block diagram illustrating top and side views of an embodiment of a stationary ring portion of a lift fan lock mechanism. In the example shown, the stationary ring portion 200 of FIG. 2A can be seen to include notch (204, 206), tab (208, 212), and magnet (210, 214) structures on diametrically opposite sides of ring 202. The notches (204, 206) and tabs (208, 212) can be seen to include material extending below a lower surface of ring 202, e.g., to provide mechanical strength and support.

In some embodiments, an insert made of Teflon™ or other durable material may be integrated with the notches (204, 206) to reduce wear associated with the locking and unlocking operations, during which the rotating magnet assembly may slide into and/or out of the notches (204, 206) potentially resulting in excessive wear.

Figure 3A:
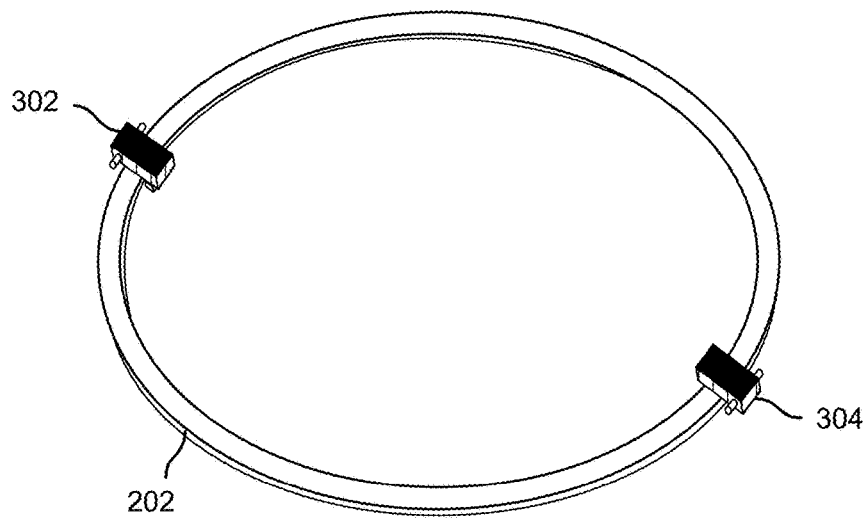
FIG. 3A is a block diagram illustrating a perspective view of an embodiment of a stationary ring portion of a lift fan lock mechanism with rotor magnet assemblies in a lift fan locked position.

FIG. 3A is a block diagram illustrating a perspective view of an embodiment of a stationary ring portion of a lift fan lock mechanism with rotor magnet assemblies in a lift fan locked position. In the example shown, rotating magnet assemblies 302 and 304 are shown in a locked position in which magnets on the underside of the rotating magnet assemblies 302 and 304 (not shown in FIG. 3A) are engaged physically and magnetically with corresponding ones of magnets 210 and 214 of FIGS. 2A and 2B and physical stop structures on the underside of the rotating magnet assemblies 302 and 304 (not shown in FIG. 3A) are engaged physically and mechanically with corresponding ones of notches 204 and 206 of FIGS. 2A and 2B.

In the example shown, rotating magnet assemblies 302 and 304 have pins running through portions of the rotating magnet assemblies 302 and 304 extending outward from and beyond the ring 202. In various embodiments, the rotating magnet assemblies 302 and 304 may be coupled to a rotating element of an associated lift fan assembly in a manner such that the respective pins remained in a fixed position relative to the rotating element of the lift fan assembly and the rotating magnet assemblies 302 and 304 each remains free to rotate about its associated pin, enabling the magnet and stop portions (not shown in FIG. 3A) to rotate up and away from the top surface of ring 202, e.g., during and subsequent to an unlock sequence or operation and/or during normal operation of the lift fan when not locked.

Figure 3B:
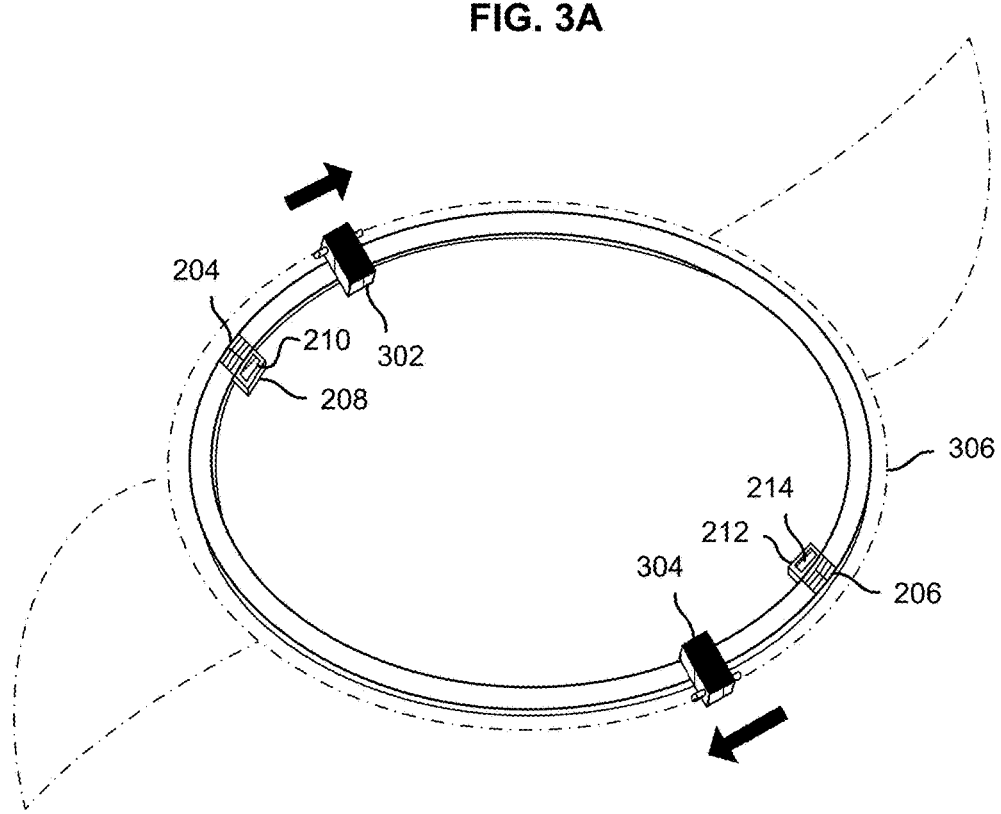
FIG. 3B is a block diagram illustrating a perspective view of an embodiment of a stationary ring portion of a lift fan lock mechanism with rotor magnet assemblies in a lift fan unlocked position.

FIG. 3B is a block diagram illustrating a perspective view of an embodiment of a stationary ring portion of a lift fan lock mechanism with rotor magnet assemblies in a lift fan unlocked position. In the example shown, a torque has been applied to a rotating element 306 of a lift fan assembly to cause the rotating magnet assemblies 302 and 304 to break free from the locked positions in which they had been held, enabling the rotating element 306 to rotate in a clockwise direction (as shown), as indicated by the large arrows adjacent to rotating magnet assemblies 302 and 304.

In some embodiments, the torque that the motor needs to apply to get out of the locked orientation is about +/−20 N*m. The peak torque capability of the motor is about +/−150 N*m. The expected aero torque when the fan is not in use and when it is in the locked position (i.e., torque associated with aerodynamic forces acting on surfaces of the lift fan while in the locked position) is about +/−5 N*m. The peak speed of the motor is about 3500 rpm. The speed necessary to avoid having the mechanism clack on the detent is about 500 rpm. In normal operation when the lift fan is intended to remain in the unlocked position, the flight control system will command torques all the way from +150 N*m to −150 N*m, but the lift fan remains above 500 rpm and as a result the rotating part(s) of the lock mechanism does/do not contact the stationary part(s). In other embodiments, depending on the design requirements, the torque required to unlock and/or the speed below which contact with the stationary part(s) of the lock mechanism and/or unintended locking may occur may be different than the values mentioned above.

In various embodiments, when a torque sufficient to break free from the locked position is applied to rotating element 306, the rotating magnet assemblies 302 and 304 break free from the corresponding locked positions in which they had been held by the magnetic and mechanical forces described above. Initially, the stop or other rigid structure on the underside of rotating magnet assemblies 302 and 304 may ride or slide along the top surface of stationary ring 202 until the rotating element 306 rotates are a sufficient rotational speed that the rotating magnet assemblies 302 and 304 rotate up and away from the stationary ring 202 as a result of centrifugal force causing each to rotate about its pin (or other rotational axis) structure as the rotating element 306 continues to rotate. In some embodiments, the stop or other structure skips over the notches 204, 206, or may slide somewhat into the notches 204, 206 but at a sufficient speed and/or under sufficient torque that the rotating magnet structure does not get engaged and locked into the locked position and instead continues through and/or past the notch (204, 206) and associated tab/magnet structures (208/210, 212/214).

Figure 4A:
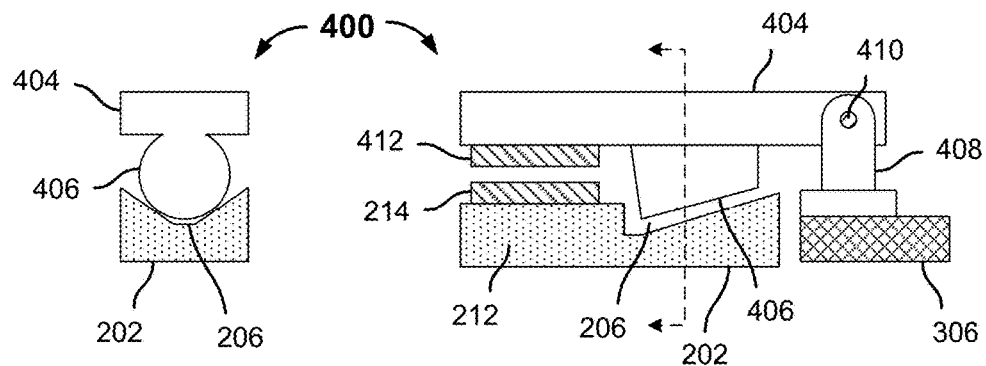
FIG. 4A is a block diagram illustrating an embodiment of a lift fan lock mechanism in a locked configuration.

FIG. 4A is a block diagram illustrating an embodiment of a lift fan lock mechanism in a locked configuration. In the example shown, rotating magnet assembly 400 comprising a lift fan lock mechanism is shown in front cross-sectional and side views. Rotating magnet assembly 400 is shown to include an arm 404 integrated with a substantially cylindrical mechanical stop portion 406 attached to a mount portion 408 by a pin 410, such that the arm 404 and stop 406 are able to rotate relative to the mount portion 408 about a longitudinal axis of pin 410 (coming out of the page as shown). Mount 406 is shown to be fixedly mounted to lift fan rotating element 306. In some embodiments, a spring element (not shown in FIG. 4A), such as a helical or other torsional spring configured to apply a counterclockwise torsional spring force about the longitudinal axis of pin 410, may be provided to tend to hold the rotating magnet assembly 400 in the position shown.

In the example shown, in the locked position a magnetic force between magnet 412 affixed to the underside of arm 404 and magnet 214 affixed to stationary tab 212 of stationary ring 202 tends to hold the rotating magnet assembly 400 in the locked position as shown in FIG. 4A, in which the stop 406 is seated in the notch 206 in ring 202. The magnet and spring forces described above result in a normal force being applied to the stop 406, which results in a force that tends to prevent the stop 406 from sliding up and out of the notch 206.

Figure 4B:
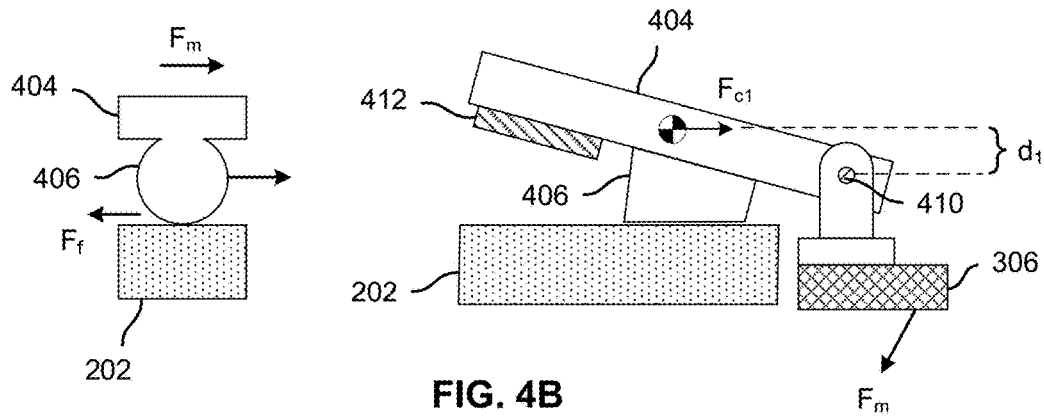
FIG. 4B is a block diagram illustrating an embodiment of a lift fan lock mechanism in an unlocked but not fully disengaged state.

FIG. 4B is a block diagram illustrating an embodiment of a lift fan lock mechanism in an unlocked but not fully disengaged state. In the example shown, a motive force Fm has been applied to rotating element 306. In some embodiments, rotating element 306 may include integrally and/or may be attached fixedly to a rotor portion of a brushless motor provided to drive the lift fan. In the position shown in FIG. 4B, sufficient torque has been applied to cause the rotating magnet assembly 400 to break free from and begin to slide away from the notch 206 and magnet 214, as in the example shown in FIG. 3B (see, e.g., rotating magnet assembly 304).

In the example shown in FIG. 4B, the mechanical stop portion 406 extends below the arm 404 at a downward angle relative to arm 404, such that when the rotating magnet assembly 400 is in the position shown in FIG. 4B, in which the stop 406 rides on the top surface of stationary ring 202, the magnet 412 is held at an angle up and away from the ring 202, and tab 212 and magnet 214. In some embodiments, this arrangement further reduces the proximity of at least a substantial portion of magnet 412 to magnet 214, and orients the respective magnetic fields in a such a way relative to each other, resulting in less magnet attraction being experienced by the rotating magnet assembly 400 as it rotates around ring 202 in the position shown in FIG. 4B.

In the position as shown in FIG. 4B, the mechanical stop portion 406 is shown to be engaged with and riding on the top surface of stationary ring 202. In the state and position shown in FIG. 4B, a centrifugal force Fc1 is being experienced by the rotating magnet assembly 400 but is not yet of sufficient magnitude to cause the arm 404 to rotate further about the longitudinal axis of pin 410 (or more precisely the longitudinal axis of the hole(s) in mount 408 through which pin 410 extends). As shown, the force Fc1 results in a moment proportional to moment arm/distance d1. In various embodiments, as the speed of rotation of rotating element 306 increases, the magnitude of the centrifugal force increases to a value such that the resulting moment is sufficient to begin to cause the arm 404 to rotate further about pin 410, resulting the stop portion 406 becoming disengaged from the surface of stationary ring 202.

Figure 4C:
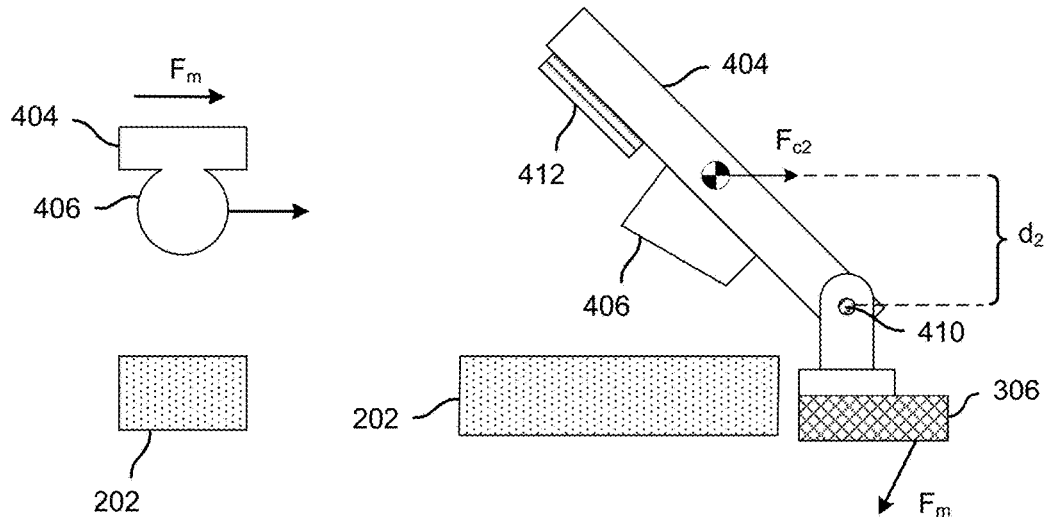
FIG. 4C is a block diagram illustrating an embodiment of a lift fan lock mechanism in an unlocked and fully disengaged state.

FIG. 4C is a block diagram illustrating an embodiment of a lift fan lock mechanism in an unlocked and fully disengaged state. In the example shown, the centrifugal force experienced by the rotating magnet assembly 400 has become sufficiently strong to cause the arm 404 to rotate further about the pin 410, resulting in the stop 406 becoming disengaged from the stationary ring 202, and the magnet 412 moving further away from the stationary magnets as the rotating element 306 continues to rotate. In some embodiments, a mechanical stop is provided to prevent the arm 404 from rotating beyond a design maximum displacement relative to the stationary ring 202.

FIGS. 4A-4C illustrate an unlock sequence of embodiments of a lift fan lock mechanism as disclosed herein. In some embodiments, a lock sequence may be illustrated by consider FIGS. 4A-4C in reverse order. For example, in some embodiments a lock sequence may include reducing torque applied to a rotating element 306 resulting in the element decreasing in rotational speed to a point at which the centrifugal force applied to the rotating magnet assembly 400 is reduced to a magnitude that is less than other forces being applied to the rotating magnet assembly 400, such as gravity, a torsional spring as described above, etc. As a result, the rotating magnet assembly 400 may rotate from the position shown in FIG. 4C to the position shown in FIG. 4B.

Aerodynamic and/or other forces may cause the rotating element 306 to remain unlocked. In some embodiments, a lock sequence as disclosed herein may be executed to cause the lift fan to move into and remain in the locked position, as shown in FIG. 4A.

Figure 4D:
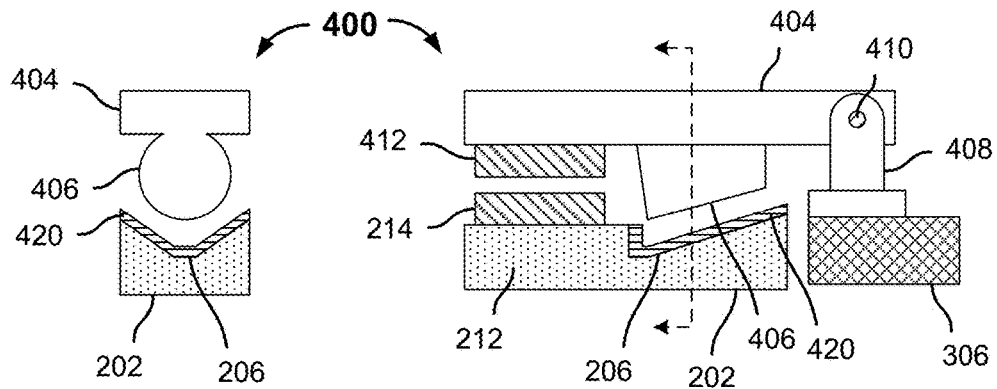
FIG. 4D is a block diagram illustrating an embodiment of a lift fan lock mechanism in a locked configuration.

FIG. 4D is a block diagram illustrating an embodiment of a lift fan lock mechanism in a locked configuration. In the example shown, an insert 420 made of Teflon™ or other durable material is integrated with the notch 206 to reduce wear associated with the locking and unlocking operations, during which the rotating magnet assembly 400 may slide into and/or out of the notch 206 potentially resulting in excessive wear.

Figure 5:
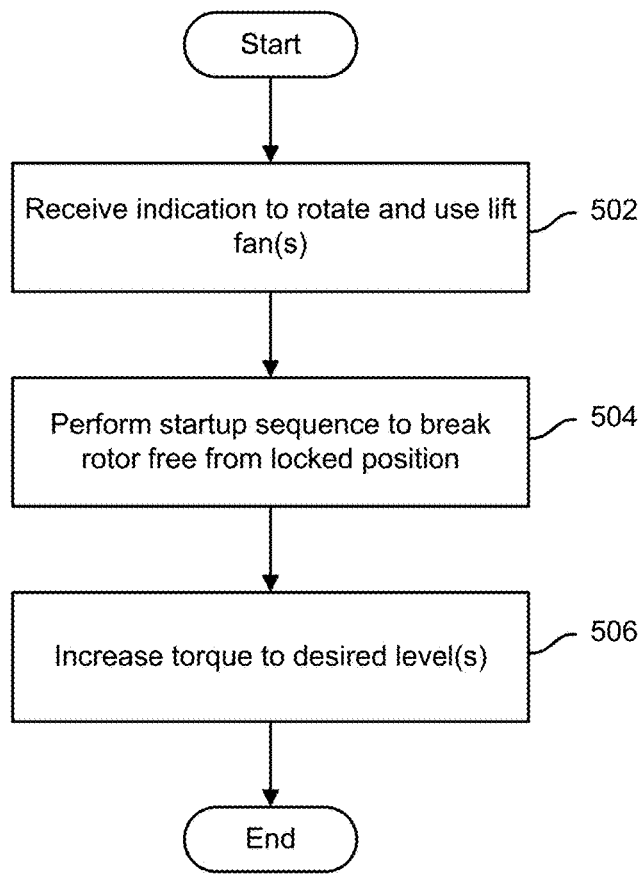
FIG. 5 is a flow chart illustrating an embodiment of a process to transition a lift fan from a locked to an unlocked state.

FIG. 5 is a flow chart illustrating an embodiment of a process to transition a lift fan from a locked to an unlocked state. In various embodiments, the unlock routine or sequence of FIG. 5 may be implemented by a controller or other computer or processor, such as a flight control computer or module, a motor controller, etc. In the example shown, an indication is received to rotate and use a lift fan (502). For example, an explicit command to start a lift fan may be received, or an indication to take off or to transition from a forward flight mode to a vertical flight mode may be received. A start up (unlock) sequence is performed to break the lift fan rotor free from the locked position (504). In some embodiments, the startup sequence includes applying a prescribed torque associated with breaking the lift fan rotor free from the locked position by overcoming forces that by design tend to hold the lift fan in the locked position, such as the magnetic, spring, and friction forces described above. Once the lift fan rotor has broken free from the locked position, torque is increased to a desired level, e.g., a level associated with a desired lift fan rotational speed, lift force, etc.

Figure 6:
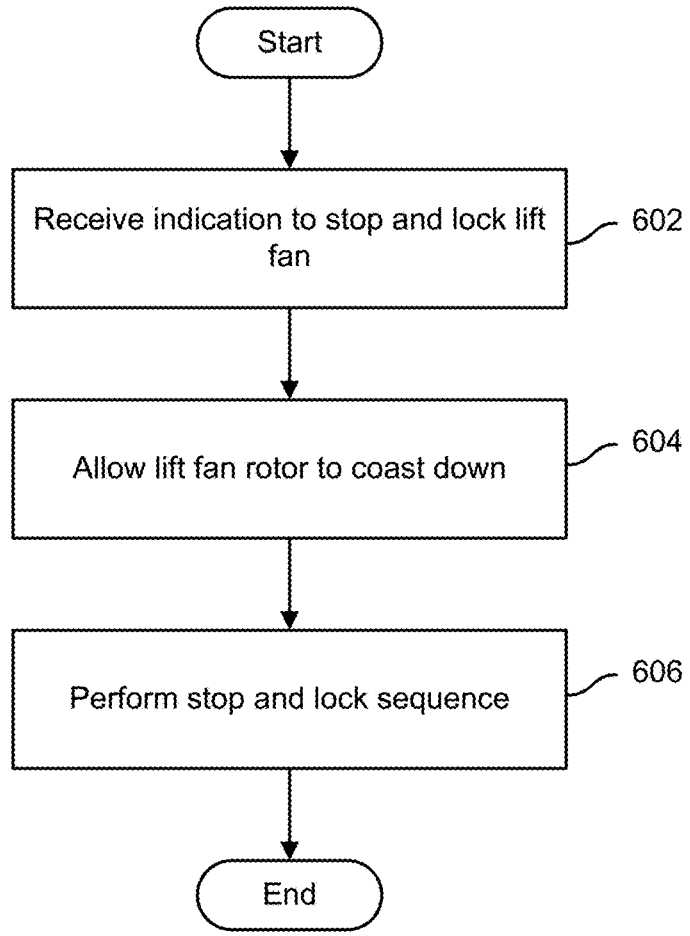
FIG. 6 is a flow chart illustrating an embodiment of a process to transition a lift fan from an unlocked to a locked state.

FIG. 6 is a flow chart illustrating an embodiment of a process to transition a lift fan from an unlocked to a locked state. In various embodiments, the lock routine or sequence of FIG. 6 may be implemented by a controller or other computer or processor, such as a flight control computer or module, a motor controller, etc. In the example shown, an indication is received to stop and lock a lift fan (602). For example, an indication may be received to stop and lock a lift fan in connection with a transition from a vertical flight mode to a forward flight mode. The lift fan rotor is allowed to coast (604). For example, torque applied using a lift fan rotor may be reduced to zero. Alternatively, the motor may be used to apply a braking force to slow the lift fan rotor. Finally, a stop and lock sequence is performed (606). For example, the lift fan rotor may coast at first to a lower rotational speed and eventually may freewheel under the influence of aerodynamic forces applied to the lift fan rotor as the aircraft moves through the air. The stop and lock sequence may include estimating a position of the lift fan rotor, e.g., relative to the stationary components of the lift fan lock mechanism, and applying to a lift fan motor a sequence of voltages at prescribed levels associated with driving the motor from the estimated position to the locked position by applying a torque that is less than the "break free" torque associated with transitioning from the locked state to an unlocked state. In some embodiments, performing the stop and lock sequence creates an opportunity for the magnetic attraction between the rotating magnet(s) and corresponding stationary magnets to pull and hold the lift fan rotor into the locked position.

In some embodiments, the stop and lock sequence increases a likelihood that the lift fan rotor will pass through the locked position under torque/speed conditions amendable to the rotating magnet assemblies being engaged by corresponding stationary structures, but does not necessarily ensure the lift fan rotor is driven to the locked position. For example, aerodynamic forces may overcome the force applied using the lift fan rotor. In various embodiments, however, performing the stop and lock sequence makes it likely that lift fan rotor eventually will rotate to and remain in the locked position, either by virtue of being driven to the locked position by the motor or as a result of other forces, such as aerodynamic forces, being applied under favorable conditions created by performing the stop and lock sequence.

Figure 7:
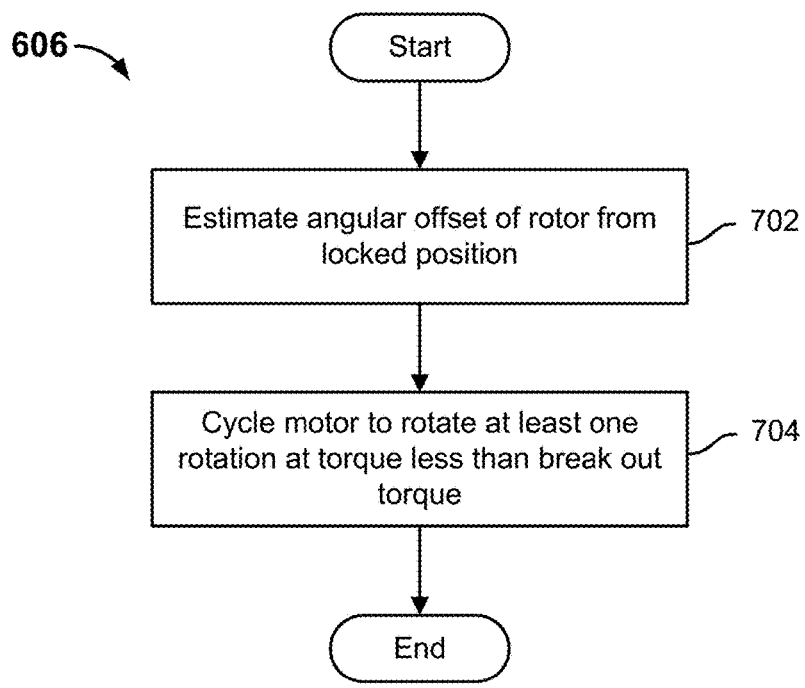
FIG. 7 is a flow chart illustrating an embodiment of a process to stop and lock a lift fan.

FIG. 7 is a flow chart illustrating an embodiment of a process to stop and lock a lift fan. In some embodiments, the process of FIG. 7 may be used to implement step 606 of the process of FIG. 6. In the example shown, an angular offset of the lift fan rotor from a locked position is estimated (702). In some embodiments, the lift fan rotor is driven by a three phase brushless motor and no angular position sensor is provided, so the angular position is estimated instead. In some alternative embodiments, a position of the rotor and/or motor shaft is determined using a sensor, and the determined position is used as the starting position of the stop and lock sequence.

The motor is cycled through at least one full rotation at a torque less than the "break out" torque required to break out of the locked position (704). In some embodiments, a sequence of voltages that would be sufficient to cycle the lift fan through two full rotations is applied. At some point during the application of such voltages the lift fan would be expected to enter and be locked in the locked position. Any torque applied through the remaining part of the sequence of voltages would be less than the torque that would be needed to break the rotor back out of the locked position. For example, in some embodiments, the motor comprises a three phase brushless motor. An open loop sequence of voltages is applied to each of the three phases, such that the rotor will tend to rotate by at least one revolution. The applied open loop voltage is of an amplitude that will not produce more torque than is necessary to leave the locked position. So, as the rotor passes by the locked position in its open loop rotation, it becomes locked and does not leave the lock.

Figure 8:
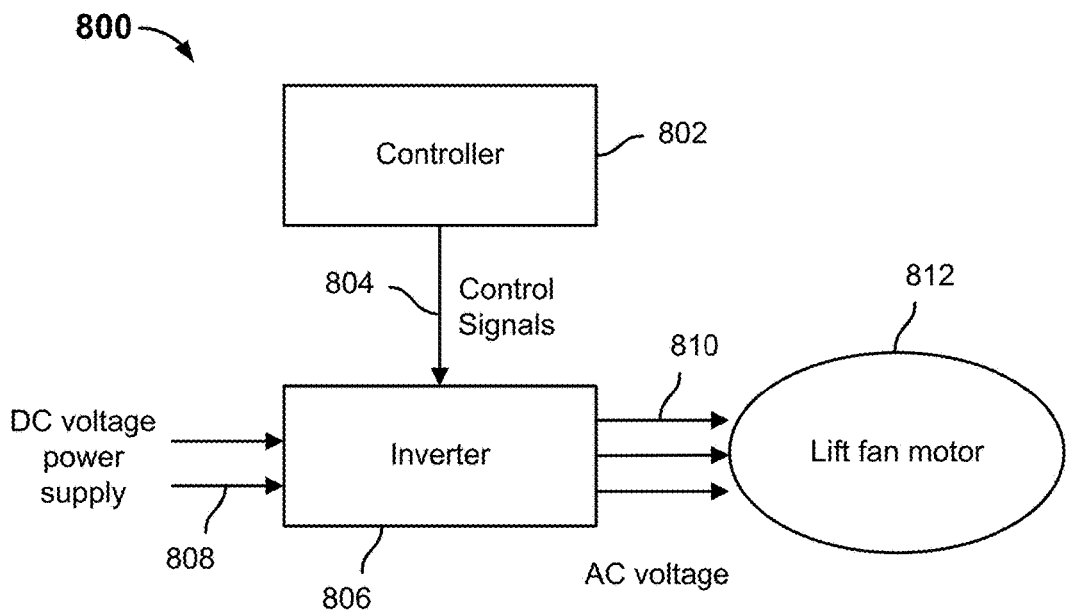
FIG. 8 is a block diagram illustrating an embodiment of a system to control a lift fan through lock/unlock sequences.

FIG. 8 is a block diagram illustrating an embodiment of a system to control a lift fan through lock/unlock sequences. In various embodiments, lift fan control system 800 of FIG. 8 may implement one or more of the processes of FIGS. 5, 6, and 7. In the example shown, lift fan control system 800 includes a motor controller 802 configured to provide control signals 804 to an inverter 806 configured to convert a DC voltage 808 received from a DC voltage power supply, such as a battery, to AC voltages 810 applied to the respective phases of a three phase brushless motor 812, which in turn is configured to drive a lift fan having a position lock mechanism as disclosed herein. In various embodiments, controller 802 may comprise one or more of a circuit and a processor configured to execute computer instructions. In various embodiments, controller 802 may be configured (e.g., by hardware, software, or both) to perform the process of FIG. 5 to cause a lift fan driven by motor 812 to change from a locked to an unlocked state, and/or to perform the processes of FIGS. 6 and 7 to cause the lift fan to transition to the locked state.

While a particular motor and/or controller may be used in certain embodiments disclosed above, in various embodiments a lock mechanism as disclosed herein may be used with other or different motors, controllers, and/or other elements, and/or with components have different characteristics (e.g., unlocking torque, locking sequence, etc.) than those described in detail above.

Techniques disclosed herein may be used, in various embodiments, to lock a lift fan in a low drag or other stowed position. A lift fan lock mechanism as disclosed herein enables a reliable locking mechanism to be provided using relatively few components in a relatively uncomplicated arrangement. Magnetic and mechanical forces hold the lift fan in place, despite the lift fan rotor experiencing aerodynamic or other forces, unless/until a torque greater than or equal to a "break out" force is applied using the lift fan motor. Similarly, stopping and locking the lift fan rotor may be achieved without providing more complicated braking mechanisms and in some embodiments without requiring shaft angular position sensors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotor lock mechanism, comprising:
a ring structure having a first surface, the ring structure including one or more detents defined in the first surface of the ring structure;
for each detent, a stationary magnet coupled fixedly to the ring structure at a location adjacent to the detent; and
a rotating magnet assembly comprising a magnet of opposite magnetic polarity to at least one of the stationary magnets and a mechanical stop structure of a size and shape to fit into a corresponding detent and engage mechanically with a surface defining at least one extent of said corresponding detent when the rotating magnet assembly is in a locked position;
wherein the stationary magnet is mounted on a tab extending inward from an inner edge of the ring structure.

2. The rotor lock mechanism of claim 1, wherein the rotating magnet assembly is configured to be attached directly or indirectly to a rotor and the ring structure is configured to be attached to a structure that does not rotate.

3. The rotor lock mechanism of claim 1, wherein said rotor lock mechanism includes a plurality of stationary magnets, including a first subset having a first magnetic polarity and a second subset having a second magnetic polarity opposite to the first magnetic polarity.

4. The rotor lock mechanism of claim 1, wherein the rotating magnet assembly includes a spring configured to apply a spring force in a direction associated with the locked position.

5. The rotor lock mechanism of claim 1, wherein the rotating magnet assembly is attached to a rotating element of an aircraft lift fan and the ring structure is attached fixedly to a non-rotating element of the aircraft lift fan.

6. The rotor lock mechanism of claim 5, wherein the aircraft lift fan is operated under control of a control module.

7. The rotor lock mechanism of claim 6, wherein the control module comprises a processor configured to perform an unlock sequence to transition the aircraft lift fan from a locked state in which the rotor lock mechanism is in a locked position to an unlocked state in which the rotor lock mechanism is not in the locked position.

8. The rotor lock mechanism of claim 7, wherein performing the unlock sequence includes applying a torque that is equal to or greater than a break free torque associated with the rotor lock mechanism.

9. The rotor lock mechanism of claim 6, wherein the control module comprises a processor configured to perform a lock sequence to transition the aircraft lift fan from an unlocked state in which the rotor lock mechanism is not in a locked position to a locked state in which the rotor lock mechanism is in the locked position.

10. The rotor lock mechanism of claim 9, wherein the performing the lock sequence includes causing the rotating element to rotate through one or more revolutions under a torque that is less than a break free torque associated with the rotor lock mechanism.

11. The rotor lock mechanism of claim 10, wherein the performing the lock sequence includes estimating an angular position of the rotating element.

12. The rotor lock mechanism of claim 1, wherein the ring comprises one or more of an axis symmetric ring; a substantially flat ring; and a conical annulus.

13. A rotor lock mechanism, comprising:
 a ring structure having a first surface, the ring structure including one or more detents defined in the first surface of the ring structure;
 for each detent, a stationary magnet coupled fixedly to the ring structure at a location adjacent to the detent; and
 a rotating magnet assembly comprising a magnet of opposite magnetic polarity to at least one of the stationary magnets and a mechanical stop structure of a size and shape to fit into a corresponding detent and engage mechanically with a surface defining at least one extent of said corresponding detent when the rotating magnet assembly is in a locked position;
 wherein the mechanical stop structure comprises a substantially cylindrical element extending beyond a plane associated with the magnet comprising the rotating magnet assembly.

14. The rotor lock mechanism of claim 13, wherein a longitudinal axis of said substantially cylindrical element is oriented at an acute angle to said plane associated with the magnet comprising the rotating magnet assembly.

15. The rotor lock mechanism of claim 13, wherein the detent comprises a v-shaped notch in said first surface of the ring structure.

16. A rotor lock mechanism, comprising:
 a ring structure having a first surface, the ring structure including one or more detents defined in the first surface of the ring structure;
 for each detent, a stationary magnet coupled fixedly to the ring structure at a location adjacent to the detent; and
 a rotating magnet assembly comprising a magnet of opposite magnetic polarity to at least one of the stationary magnets and a mechanical stop structure of a size and shape to fit into a corresponding detent and engage mechanically with a surface defining at least one extent of said corresponding detent when the rotating magnet assembly is in a locked position; and
 further comprising an insert set into said detent, the insert being made of a first material that is harder that a second material of which the ring structure is made.

17. A rotor lock mechanism, comprising:
 a ring structure having a first surface, the ring structure including one or more detents defined in the first surface of the ring structure;
 for each detent, a stationary magnet coupled fixedly to the ring structure at a location adjacent to the detent; and
 a rotating magnet assembly comprising a magnet of opposite magnetic polarity to at least one of the stationary magnets and a mechanical stop structure of a size and shape to fit into a corresponding detent and engage mechanically with a surface defining at least one extent of said corresponding detent when the rotating magnet assembly is in a locked position;
 wherein the rotating magnet assembly is configured to be attached fixedly to a rotor via a base structure with respect to which at least a portion of the rotating magnet assembly that includes the magnet and the mechanical stop structure is connected via a pin or other axially oriented structure in a manner such that at least said portion remains free to rotate about an axis associated with the pin or other axially oriented structure.

18. The rotor lock mechanism of claim 17, wherein a center of mass of said portion of the rotating magnet assembly is substantially aligned with said axis in a plane substantially parallel to a plane of said ring structure when the rotating magnet assembly is in the locked position.

19. The rotor lock mechanism of claim 18, wherein the center of mass of said portion of the rotating magnet assembly is located at a non-zero distance d from said plane substantially parallel to said plane of said ring structure when the rotating magnet assembly is in an unlocked position in which the mechanical stop structure is no longer in said detent.

* * * * *